United States Patent
Chang

[11] Patent Number: 5,488,273
[45] Date of Patent: Jan. 30, 1996

[54] CEILING FAN AND LIGHT ASSEMBLY CONTROL METHOD AND THE CONTROL CIRCUIT THEREFOR

[76] Inventor: Chin-Hsiung Chang, No. 192, Shu Jen Rd., Ban Tan Chun, Wu Fong Hsiang, Taichung Hsien, Taiwan

[21] Appl. No.: 341,117

[22] Filed: Nov. 18, 1994

[51] Int. Cl.[6] .......................... H04Q 7/02; A63H 30/04
[52] U.S. Cl. ...................... 318/16; 318/480; 367/198; 446/454; 340/825.22
[58] Field of Search ........................... 388/800–898; 318/16, 103, 560–646, 40–89; 416/61, 170 R, 100, 246; 340/825.22, 825.69, 825.57, 310 A; 446/454; 367/198, 197; 417/234, 229, 572

[56] References Cited

U.S. PATENT DOCUMENTS

| | | | |
|---|---|---|---|
| 3,892,920 | 7/1975 | Kolm | 340/825.22 |
| 4,245,430 | 1/1981 | Hoyt | 318/587 |
| 4,705,994 | 11/1987 | Koike | 318/16 |
| 4,716,409 | 12/1987 | Hart et al. | 340/825.22 |
| 4,719,446 | 1/1988 | Hart | 340/310 A |
| 4,768,926 | 9/1988 | Gilbert, Jr. | 416/61 |
| 4,818,920 | 4/1989 | Jacob | 318/16 |
| 5,187,472 | 2/1993 | Hart et al. | 340/825.69 |
| 5,189,412 | 2/1993 | Mehta et al. | 340/825.22 |
| 5,256,039 | 10/1993 | Crawford | 417/234 |
| 5,365,154 | 11/1994 | Schneider et al. | 318/103 |
| 5,385,344 | 1/1995 | Miller et al. | 273/460 |

*Primary Examiner*—Paul Ip
*Attorney, Agent, or Firm*—Varndell Legal Group

[57] ABSTRACT

A ceiling fan and light assembly control method and circuit that uses a single-throw switch or clapping of hands to control the fan speed or light intensity of a ceiling fan and light assembly. The control circuit obtains a 60 Hz square wave with a cycle of 16.67 ms from alternating current city power supply so that when the single-throw switch is switched off and then switched on immediately, a triggering signal is produced to drive a microprocessor, causing it to regulate the fan speed or light intensity of the ceiling fan and light assembly. Alternatively, when two or three continuous claps are received by a microphone, the microprocessor will be triggered to regulate the fan speed or light intensity of the ceiling fan and light assembly.

2 Claims, 4 Drawing Sheets

5,488,273

CEILING FAN AND LIGHT ASSEMBLY CONTROL METHOD AND THE CONTROL CIRCUIT THEREFOR

BACKGROUND AND SUMMARY OF THE INVENTION

The present invention relates to a method of using sound or a single-throw switch circuit to control the revolving speed and light intensity of a ceiling fan and light assembly. The present invention also relates to a control circuit for controlling the operation of the ceiling fan and light assembly, which uses a single chip microprocessor to control the operation of the control circuit.

The operation of conventional ceiling fan and light assemblies are commonly controlled by a pull chain switch. Because this structure of pull chain switch is a mechanical device, the revolving speed of the ceiling fan of the ceiling fan light assembly and the light intensity of the lamps on the ceiling fan must be controlled in proper order by the pull chain switch, that is the control of the revolving speed of the ceiling fan and the control of the light intensity of the lamps on the ceiling fan can not be separately executed. Furthermore, the use of the pull chain switch destroys the sense of beauty of the ceiling fan and light assembly.

There is known another control method which eliminates the aforesaid problem. This control method uses two separate switches to control the operation of the ceiling fan and the operation of the lamps respectively. The switch for controlling the operation of the ceiling fan is a rotary switch, which is commonly installed in the wall and turned to regulate the revolving speed of the ceiling fan by changing the impedance of a capacitor, which provides power supply to the fan motor of the ceiling fan. The major drawback of this method is the complicated installation procedure of the switches.

There is known still another control method to control the operation of a ceiling fan and light assembly by means of a remote-controller. It is convenient and functional to use a remote-controller to control the operation of a ceiling fan and light assembly. However, the cost of a remote-controller for this purpose is high. If the remote-controller of a ceiling fan and light assembly is damaged or lost, or the battery power supply of the remote-controller is used up, the ceiling fan and light assembly becomes unworkable.

There is known still another control method to control the operation of a ceiling fan and light assembly by means of a multi-step single-throw switch. However, this structure of multi-step single-throw switch is a mechanical switching device which can not eliminate the drawback of controlling the revolving speed of the ceiling and the light intensity of the lamps in proper order.

The present invention has been accomplished under the circumstances in view. It is the major object of the present invention to proivde a ceiling fan and light assembly control method which controls the revolving speed of the fan and the light intensity of the lamps by means of a single-throw switch or by clapping the hands two or three times.

DETAILED DESCRIPTION OF THE PREFERRED EMBODIMENT

Figure 1:
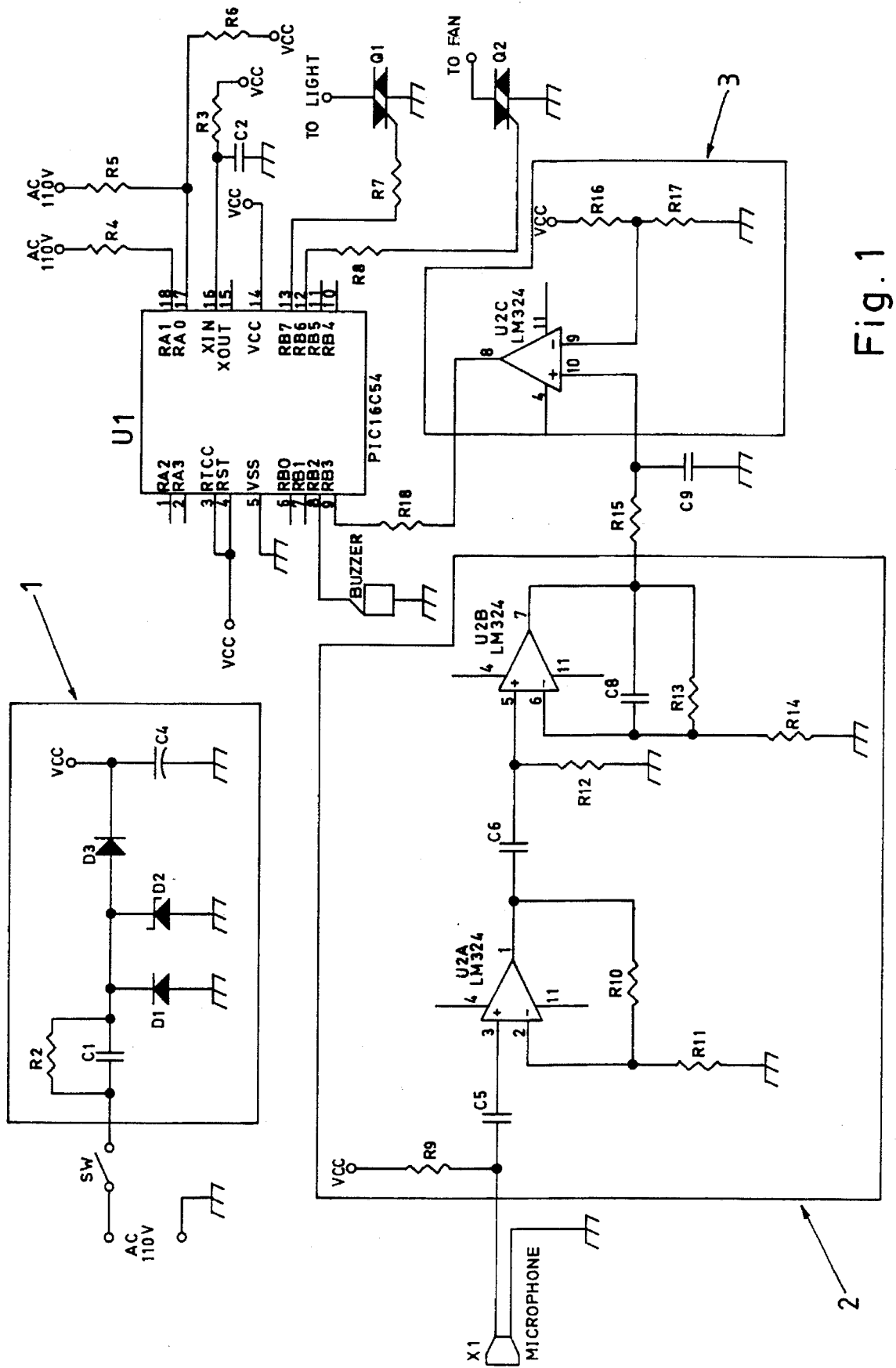
FIG. 1 is a circuit diagram according to the present invention.
Figure 2:
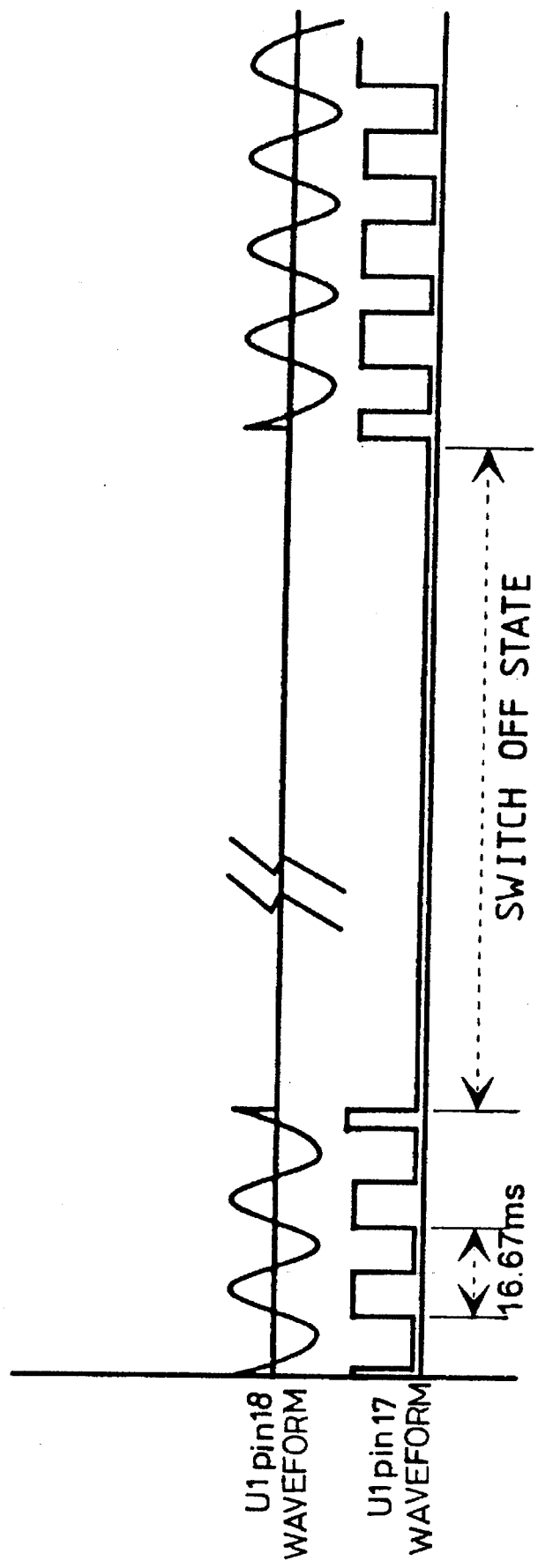
FIG. 2 is a time sequence chart of the signal waveforms of the single-throw switch according to the present invention.
Figure 3:
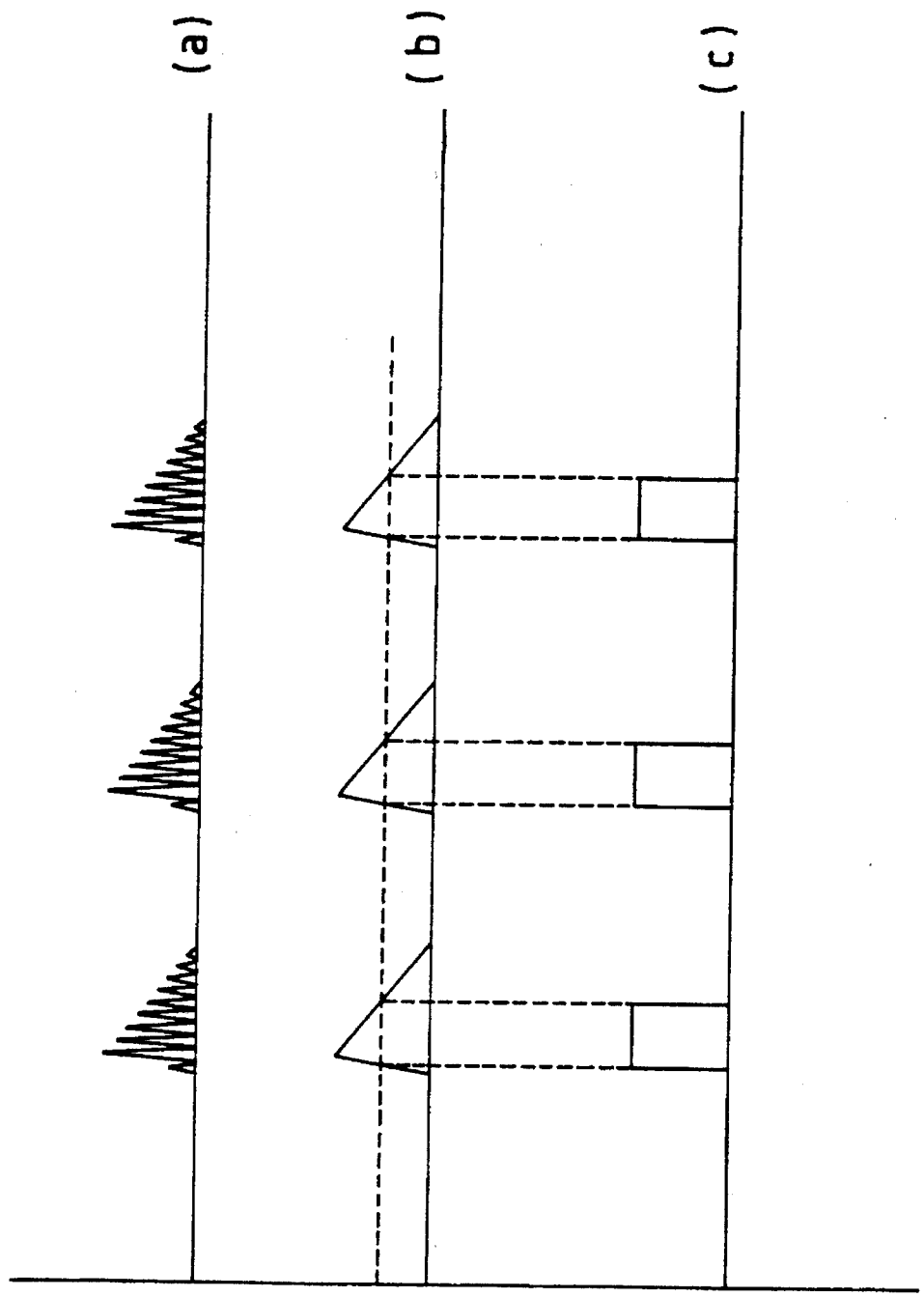
FIG. 3 is waveform chart showing the voice-activated signal waves according to the present invention.

FIG. 1 shows a circuit diagram of a ceiling fan and light assembly control circuit according to the present invention, which uses a 8-bit single chip microprocessor PIC16C54 U1 as the control center. Alternating current 110 V city power supply is connected in series to a single-throw switch SW, then connected to a direct current power supply circuit 1 to provide a direct current 5 V power supply, and then connected to one end of a series of resistors R5 and R6. The middle point of the series of resistors R5 and R6 is connected to RA0 pin 17 of the microprocessor U1 to obtain a low voltage square wave of cycle 16.67 ms (equal to city power supply; see FIG. 2). Alternating current city power supply which is controlled by the single-throw switch SW is further connected to a voltage dropping resistor R4 and then to RA1 pin 18 of the microprocessor U1. Therefore, a low voltage city power supply waveform is obtained. The TRIAC Q1, which regulates the light intensity of the lamps, and the TRIAC Q2, which regulates the revolving speed of the fan, are respectively connected RB6 pin 12 and RB7 pin 13 of the microprocessor U1. An audio amplifier circuit 2 is provided having the output terminal connected RB3 pin 9 of the microprocessor U1. The audio amplifier circuit 2 comprises a microphone X1 which receives outside voices, a serial amplifier formed of two operational amplifiers U2A and U2B connected in series to the microphone XI to amplify the signal obtained from the microphone X1, and a RC low-pass filter R15 and C9 connected to the serial amplifier U2A and U2B to filtrate noises. There is proivded a comparator 3; U2C having the non-inverter terminal connected to the RC low-pass filter R15 and C9 and the inverter terminal connected to the middle point of a series of shunt resistors R16 and R17. When the output voltage of the serial amplifier U2A and U2B surpasses the voltage value at the middle point of the series of shunt resistors R16 and R17, the comparator U2C outputs a saturation voltage Vsat. When the single-throw switch SW is ON, alternating current city power supply is inputted into the ceiling fan and light assembly control circuit, RA1 pin 18 and RA0 pin 17 of the microprocessor 81 receive a 60 Hz sine wave and a 60 Hz square wave respectively (see FIG. 2). When the user switches off the single-throw switch SW and then switches it on immediately, alternating current city power supply (square wave) is interrupted over 16.67 ms (during the interruption, the filter capacitor C4 of the direct current power supply circuit 1 provides the necessary working voltage to the microprocessor U1). This interruption of power supply causes an interrupting signal to the microprocessor U1, and therefore the microprocessor U1 is triggered to regulate the revolving speed of the fan or the light intensity of the lamps according to the setting of its internal software program. When the user claps the hands two or three times continuously, the audio signal is picked up by the microphone X1 and then amplified by the serial amplifier of the audio amplifier circuit 2 to obtain a waveform as shown in (a) of FIG. 3. The signal from the serial amplifier is then filtrated through the RC low-pass filter R15 and C9 to remove high frequency. The waveform of the signal from the output terminal of the RC low-pass filter R15 and C9 is shown as (b) in FIG. 3. When the signal from the RC low-pass filter R15 and C9 passes through the comparator 3, the waveform is changed to what shown as (c) in FIG. 3. According to the number of continuous pulse waveforms and its time interval, the microprocessor U1 determines that the signal is a noise, a speed control signal, or a light intensity control signal.

Figure 4:
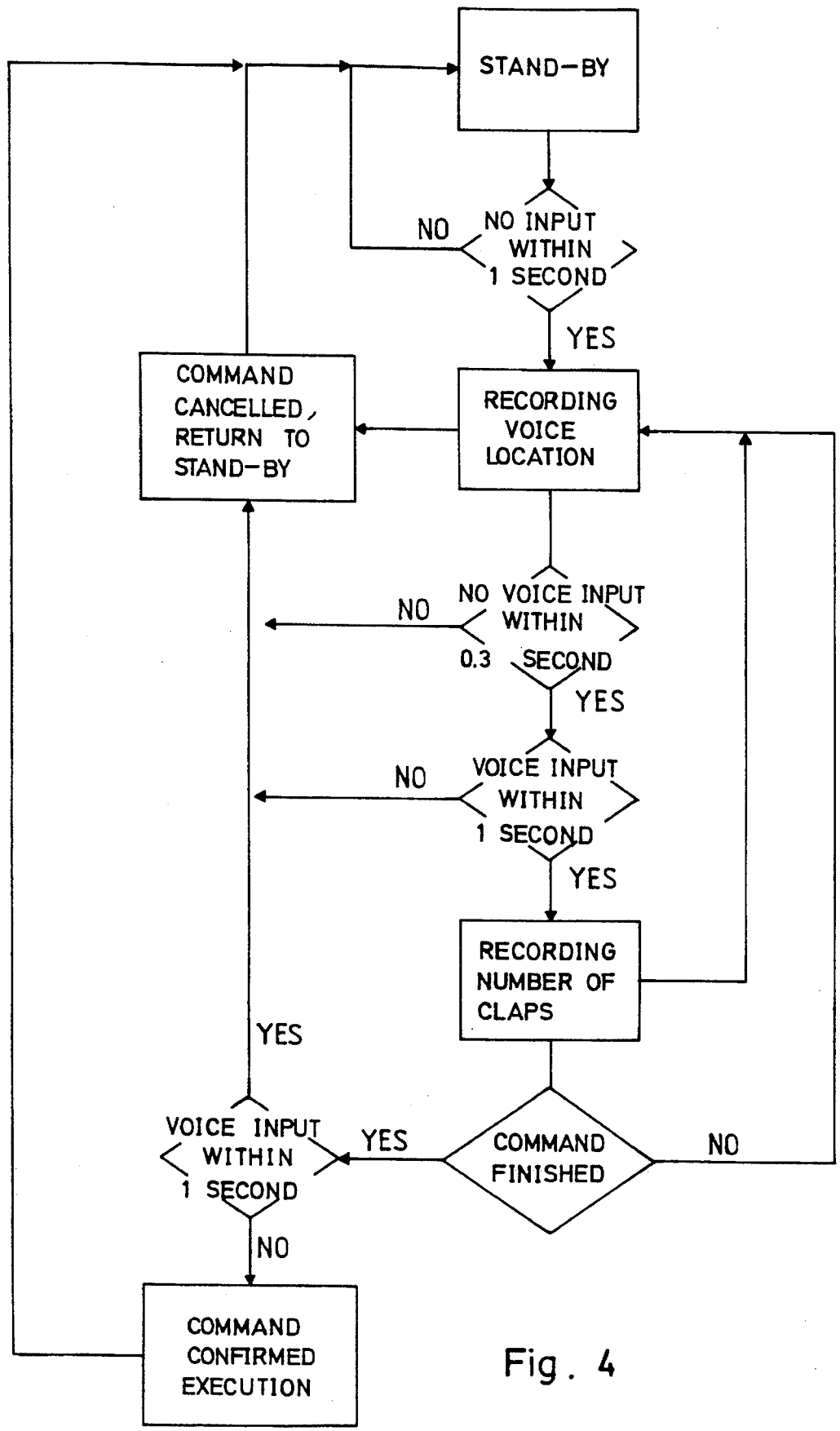
FIG. 4 is an operation flow chart of the internal program of the microprocessor according to the present invention.

Referring to FIG. 4, when the microprocessor U1 receives a first pulse wave (the first clap (sound of claping the hands), it starts to count time. If the second and/or third pulse wave (the second clap) is received within 0.3 to 0.6 second, the signal is determined effectively, and the program will wait for one second to check if there is any further pulse wave signal. If no further pulse wave signal is received, the program judges the nature of the control signal according to the number of the effective pulse waves (number of claps). If there are two continuous claps, the control signal is judged for light intensity regulation control. If the time interval between two continuous pulse waves is shorter than 0.3 second, these two continuous pulse waves are regarded as noises and rejected. If the time interval between two continuous pulse waves is longer than 0.6 seconds, the second pulse wave is regarded as the first effective pulse wave, and the first pulse wave is regarded as a noise. Through the aforesaid recognition procedure, the microprocessor U1 will not be triggered by false signals. Furthermore, a buzzer may be connected to the output terminal of the microprocessor U1. When the microprocessor regulates the revolving speed of the fan, it simultaneously turns on the buzzer, causing it to give an audio notice.

I claim:

1. A ceiling fan and light assembly control circuit comprising a direct current power supply circuit, an audio amplifier circuit, a microphone, a low pass filter circuit, a comparator, and a microprocessor; said direct current power supply circuit receiving alternating current power through a single-throw switch, converting said alternating current into low voltage direct current power when said single-throw switch is on and supplying said low voltage direct current power to said audio amplifier circuit, said comparator and said microprocessor; said direct current supply circuit containing a filter capacitor for supplying direct current to said microprocessor when said single-throw switch is turned off after said capacitor is charged; resisters arranged between said single-throw switch and inputs of said microprocessor for creating a square wave signal from said alternating current power and supplying said square wave signal to said microprocessor only when said single-throw switch is on; said microphone connected to said audio amplifier circuit, and said low-pass filter connected in series between said audio amplifier circuit and said comparator for amplifying signals received by said microphone, filtering the amplified signals, comparing the filtered signals and producing pulse wave signals based thereon; said microprocessor having an input terminal connected to said comparator and receiving said pulse wave signals, an output terminal connected to a fan speed control circuit and a light intensity control circuit of a ceiling fan and light assembly and an internal program; said internal program monitoring said square wave signal and, when said square wave signal is interrupted by turning said single-throw switch off and on while said microprocessor receives power from said filter capacitor, changing fan speed or light intensity; said internal program also monitoring said pulse wave signals received from said comparator and changing fan speed or light intensity based on number of said pulse wave signals received and a time interval between said pulse wave signals.

2. The ceiling fan and light assembly control circuit of claim 1 further comprising a buzzer controlled by said microprocessor to produce a sound when said microprocessor regulates the fan speed.

* * * * *